(12) United States Patent
Siegel et al.

(10) Patent No.: US 6,829,565 B2
(45) Date of Patent: Dec. 7, 2004

(54) STEPPER MOTOR AUTOMATED SELF-TEST ROUTINE

(75) Inventors: Robert P. Siegel, Penfield, NY (US); Kevin E. Price, Hilton, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/369,043

(22) Filed: Feb. 14, 2003

(65) Prior Publication Data

US 2004/0162704 A1 Aug. 19, 2004

(51) Int. Cl.$^7$ .......................... G05B 19/40; G01R 31/34
(52) U.S. Cl. ..................................... 702/182; 324/772
(58) Field of Search .......................... 324/772; 318/685, 318/696; 702/108, 182

(56) References Cited

U.S. PATENT DOCUMENTS

| | | | | |
|---|---|---|---|---|
| 4,422,040 A | * | 12/1983 | Raider et al. | 324/772 |
| 4,496,891 A | * | 1/1985 | Kobayashi | 318/696 |
| 4,882,530 A | * | 11/1989 | Kabune et al. | 318/696 |
| 5,424,960 A | * | 6/1995 | Watanabe et al. | 702/41 |
| 6,054,835 A | * | 4/2000 | Thiemann et al. | 318/685 |
| 6,133,840 A | * | 10/2000 | Nagata | 340/648 |
| 6,538,407 B2 | * | 3/2003 | Tanaka | 318/445 |
| 6,616,446 B1 | * | 9/2003 | Schmid | 433/27 |

* cited by examiner

*Primary Examiner*—Marc S. Hoff
*Assistant Examiner*—Paul L Kim
(74) *Attorney, Agent, or Firm*—William A. Henry

(57) ABSTRACT

A printing apparatus includes a stepper motor automated self-test routine that gives an approximation of the state of the degradation of the stepper motor and/or its driven load. The test includes artificially increasing the starting frequency above normal and/or reducing the operation current below normal by a known and controllable amount to the stepper motor and tracking the level at which the motor is just able to start operating. By examining the magnitude and/or change in these levels, the remaining life and reliability of the motor can be predicted. Alternatively, the self-test routine could be used in conjunction with paper path sensors to determine the start time for a stepper motor. The start times are stored for trend analysis.

6 Claims, 5 Drawing Sheets

STEPPER MOTOR AUTOMATED SELF-TEST ROUTINE

BACKGROUND OF THE INVENTION

1. Field of the Invention

This invention relates generally to an image forming system and, in particular, to a system and method of automatically testing degradation of stepper motors in an imaging apparatus.

2. Description of Related Art

Electrophotographic printing systems, such as digital copiers, are widely used in industry. In a digital imaging machine, an image of a document is captured by an input scanning facility, and converted into selected digital image data. A control unit then typically compresses this image data, then either forwards it to a suitable printing module or stores it in system memory.

A production printing system contains an inherently high premium for reliability and uptime since downtime represents a potential loss in profits to a business. The printing system may have as many as 30 stepper motors. The stepper motors are located throughout the machines and are used to enable any number of machine functions. Many stepper motors are used in the paper path. Paper jams, a major source of customer inconvenience, are often caused by a small disturbance in machine timing, such as that which might occur in the case of a stepper motor missing a step or hesitating. These problems, being intermittent are very difficult to diagnose. While stepper motors are generally considered reliable, there are always exceptions, and the mechanical assemblies that they drive could potentially have significant failure rates.

A method and apparatus for diagnosing whether a solenoid in an imaging forming system is functioning properly is disclosed in U.S. Pat. No. 6,326,898 B1 and includes sending an actuating current to a particular solenoid while a current waveform and elapsed time such as pull-in time value are noted for instances when the solenoid is in a first position and a second position. The first position can be one in which a solenoid plunger is extended and the second position can be one in which the solenoid plunger is retracted, or vice versa. Based at least partially on the measured actuating current values prior to the beginning and after the ending of solenoid movement, and measured time values, a determination can be made as to whether the solenoid is functioning properly by comparing these values to predetermined values for a properly functioning solenoid.

Hence, there is still a need to predict when a stepper motor needs to be replaced before failure occurs.

SUMMARY OF THE INVENTION

Accordingly, pursuant to the features of the present invention, a printing apparatus is disclosed that includes a stepper motor automated self-test routine that gives an approximation of the state of degradation of the stepper motor and/or its driven load. The test includes artificially increasing the starting frequency and/or reducing the operating current by a known and controllable amount to a stepper motor and tracking the level at which the motor is just able to start operating. By examining the magnitude and/or change in these levels, the remaining life and reliability of the motor can be predicted. This information can then be conveyed to a service technician either locally or remotely to initiate a repair/replace action, thereby reducing unscheduled maintenance.

Alternatively, the self-test routine could be used in conjunction with existing paper path sensors to detect the occurrence of a successful start and determine the start time for a stepper motor. The start times are stored for trend analysis.

These and other features and advantages of the invention are described in or apparent from the following detailed description of the exemplary embodiments.

BRIEF DESCRIPTION OF THE DRAWINGS

The foregoing and other features of the instant invention will be apparent and easily understood from a further reading of the specification, claims and by reference to the accompanying drawings in which like reference numerals refer to like elements and wherein:

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
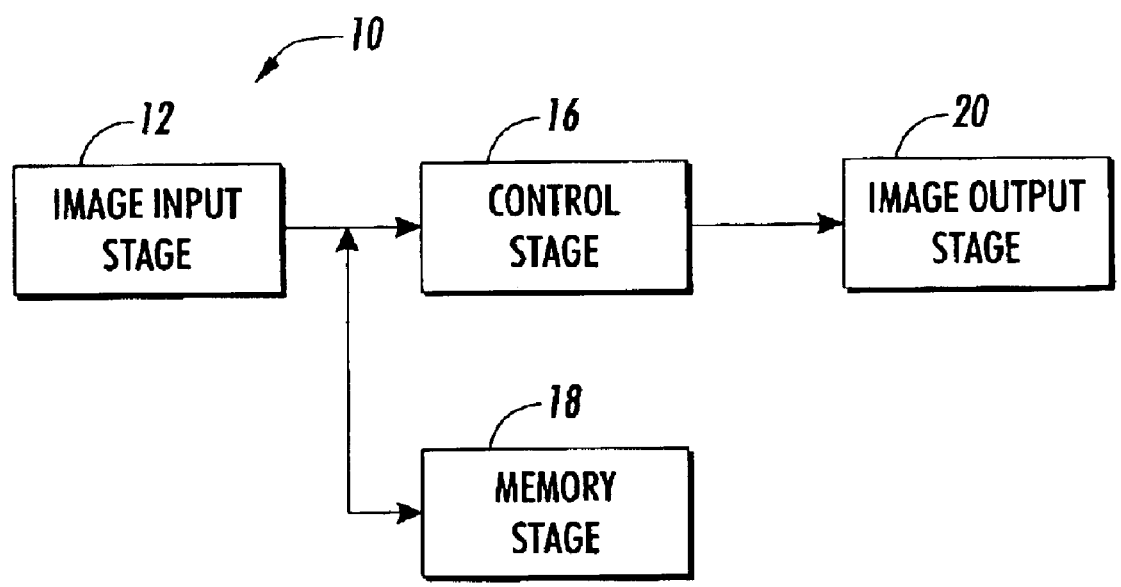
FIG. 1 is a schematic block diagram of an image reproducing system suitable for employing one or more stepper motors and a data storage and retrieval system according to the present invention.

For a general understanding of the features of the present invention, reference is made to the drawings. In the drawings, like reference numerals have been used throughout to identify identical elements. FIG. 1 schematically illustrates a system and method for diagnosing degradation of stepper motors according to the present invention. Although the present invention will be described with reference to the example embodiments illustrated in the figures, it should be understood that the present invention can be embodied in many alternative forms, and need not necessarily be applied only to image forming systems. In additions, any suitable size, shape, or type of elements or materials can be utilized.

The present invention provides a method of diagnosing degradation of stepper motors within an image forming or reproduction system. The method can be employed for stepper motors in any type of machine, or even independent of any machinery. The method is also valid for those stepper motors found in a number of different types of reproducing systems. Examples of image reproducing systems include electrophotographic, electrostatic, ionographic, and other types of image forming or reproducing systems that are adapted to capture and/or store image data associated with a particular object, such as a document.

An example of a general image forming or reproducing system employing one or more stepper motors that are diagnosable by embodiments of the present invention is illustrated in FIG. 1. The illustrated image reproducing system 10 includes an image-input stage 12 that is adapted to acquire or receive image data, such as an image of a document. The image data is then transferred to either or both a control stage 16 and a memory stage 18. The memory stage 18 can include any suitable storage or memory module adapted for storing the image data, examples of which include RAM, ROM, floppy disks, hard drives, and the like. The control stage 16 includes an arrangement for controlling the retrieval from or transfer of image data to an image output stage 20. The illustrated image output stage 20 can include any suitable apparatus for reproducing the image on a substrate, such as, a conventional printer or copier.

Figure 2:
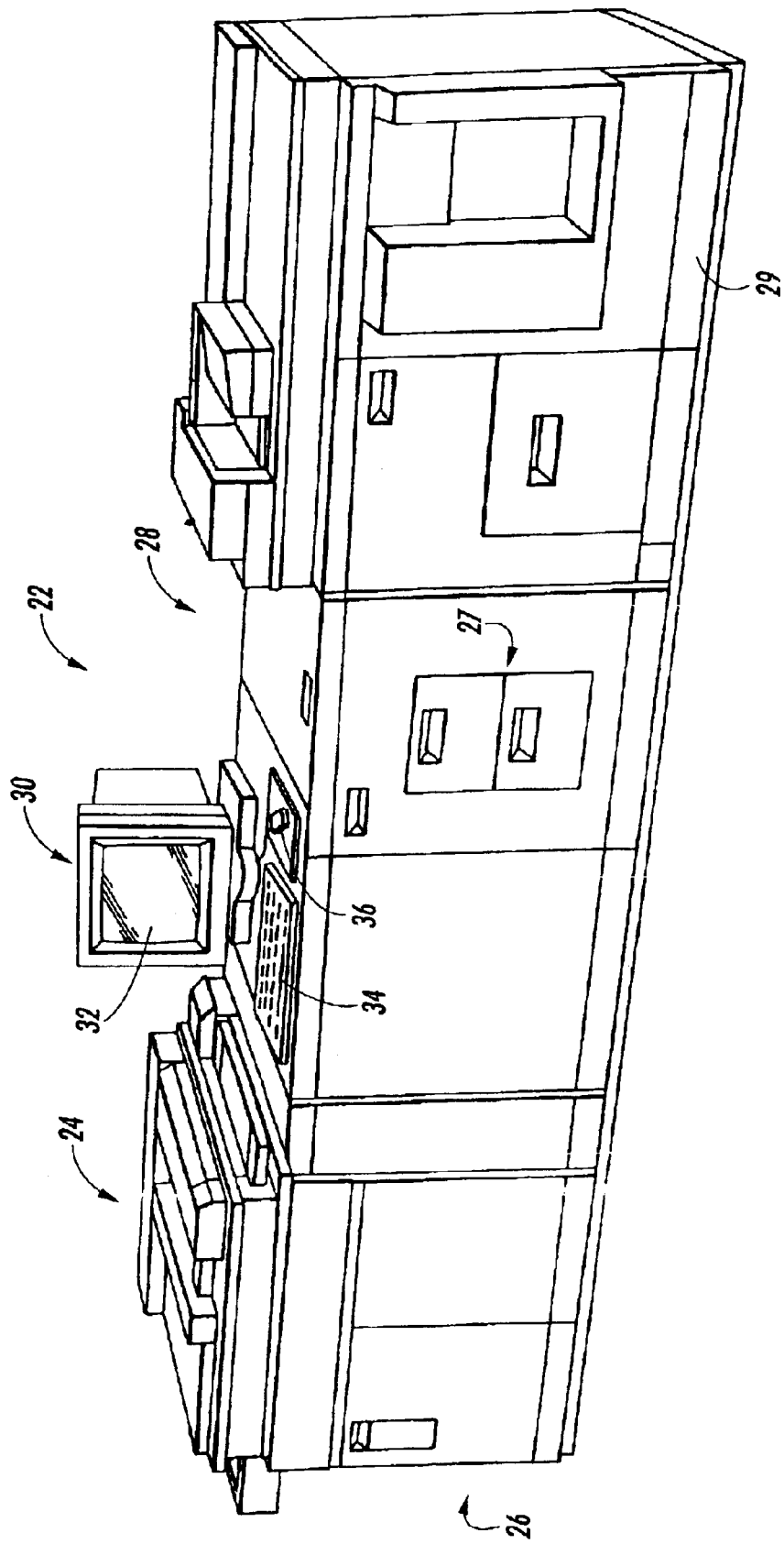
FIG. 2 is a perspective view of an example image reproducing system suitable for employing one or more stepper motors and a data storage and retrieval system in accordance with the present invention.

FIG. 2 is a perspective view of a general electrophotographic printing system, such as a digital copier. The illustrated printing system 22, for purposes of explanation, can be divided into multiple sections according to functionality, such as the image input stage 24, control stage 26, paper supply 27, image output or printer stage 28, and finisher stage 29. In the illustrated printing system 22, the image input stage 24 can include both local (e.g., on-site) and remote image inputs, thus enabling the printing system 22 to provide network, scan, and print services in a single integrated system. Although not illustrated herein, other system combinations and arrangements can also be employed in the printing system 22 and are known to the ordinarily skilled artisan, such as, a stand alone printing system with on-site image input (i.e., a scanner), controller, and printer assemblies; a network printing system with remote input, controller, paper, printer and finisher assemblies; and like system configurations.

In addition, while a specific printer stage 28 is shown and described in the exemplary printing system 22, the present invention also contemplates using other types of printing systems. For example, the printer stage 28 can instead employ an ink jet printer, an ionographic printer, a thermal printer, a photographic printer, etc. Furthermore, imaging functions of the printer stage 28 can be incorporated in electronic display systems, such as CRTs, LCDs, LEDs, or other like image scanning, processing, or recording systems. Or alternatively, other signal transmitting, receiving and recording systems.

For remote or off-site acquisition or inputting of image data into the printing system 22, the image input stage 24 can include a network interface (not shown) with a suitable communication channel, such as, a telephone line, enabling image data in the form of image signals or pixels to be inputted or introduced to the image input stage from one or more remote sources for processing. Other remote sources of image data, such as, streaming tape, floppy disk, video camera, and the like are also contemplated by example embodiments of the present invention.

For on-site image input, the image input stage 24 may include a scanner (not shown) that can employ a universal or automatic document handler (not shown) for the purpose of automatically and sequentially placing and locating documents for scanning. Conversely, a manual mode document mode and/or a Computer Forms Feeder (CFF) mode can also be provided, the latter to accommodate documents in the form of computer fanfold.

The user interface 30 can include a combined operator controller/CRT display consisting of an interactive touch-screen 32, keyboard 34, and mouse 36, as shown in FIG. 2. The user interface 30 preferably enables the operator to interface with the printer stage 28, so as to program print jobs and other instructions, and to obtain system operating information, instructions, programming information and icons, diagnostic information, visual document facsimile display and pictorial views, and the like. Items displayed on the touch-screen 32, such as, files and icons, are actuated by either touching the displayed item on the screen 32 or by using the mouse 36 to manipulate a cursor (not shown) to select an item.

The electrographic printing system 22 can also include a paper supply section 27, and a finisher stage 29. As will be appreciated by those skilled in the art, the print media can comprise a selected one of various known substrates which are capable of accepting an image, examples of which include transparencies, preprinted sheets, vellum, glossy cover stock, film and the like. The printing media can also comprise any of a variety of sheet sizes, types, and colors and for this, plural media supply trays of the paper supply section 27 can be provided. The developed image transferred to the printing media can be permanently fixed or fused and the resulting prints discharged either to an output tray or to the finisher stage 29. The finisher stage 29 provides certain finishing selections (not shown), such as, a stitcher for stitching or stapling the prints together to form books, a thermal binder for adhesively binding the prints into books, and/or other finishing options, such as, slitting, perforating, saddle stitching, folding, trimming, or the like.

Within the electrographic printing system 22, and all of the various systems described, conventional stepper motors (not shown) are found in a plurality of locations and functions. Typically, one of the most common functions of stepper motors is to initiate sheet entry into a machine paper path, as well as, sheet movement through the machine paper path. This is often done by triggering the rotation of feed rolls that drive sheets away from a stack of sheets in a feed tray, as well as, control the rotation of drive rolls that transport copy sheet throughout a machine. Other numerous functions, not mentioned herein, are executed by stepper motors within image forming machines, as well as within other types of machines and systems.

Because there are so many uses for stepper motors in the electrographic printing system 22, there is a constant and continuing need to ensure that the stepper motors are functioning properly. In an example embodiment of the present invention, a method is provided for analyzing a particular stepper motor and determining whether or not it is properly functioning. Although described in connection with one stepper motor, the diagnosis can be performed on a plurality of stepper motors, independent, or simultaneously.

Figure 3:
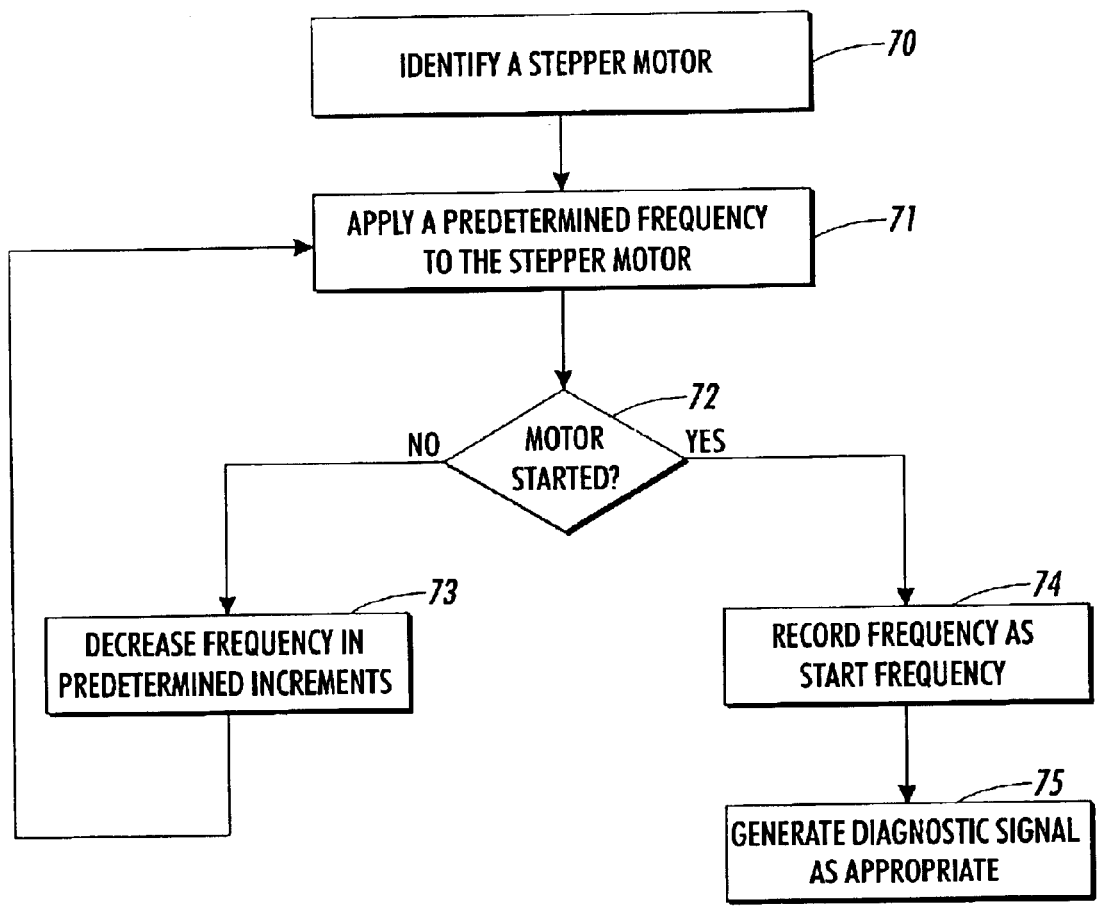
FIG. 3 is a schematic flow chart diagram illustrating the steps performed to determine if stepper motors in image reproducing system of FIG. 1 are degrading.

In accordance with the present invention, a built in self-test for stepper motors is depicted in FIG. 3 which gives a reasonable approximation of the state of the degradation of the motor and/or its driven load. The test consists of a series of stress conditions applied to the motor while checking to see if the motor will start under those conditions. This requires the ability to detect a successful start. The degree of stress required to cause the motor not to start can be correlated to operating margin. This can be tracked over time, and used to predict the remaining life or reliability of the motor/system. It is known from laboratory failure analysis that component test data shows a response to aging of stepper motors as a falloff in start frequency. Stated another way, as a motor deteriorates, its ability to respond to a high start frequency is diminished.

A stepper motor that could initially start consistently in response to a 1000 Hz input, might fail to start under that condition, but could still start consistently at 900 Hz. By applying a start frequency greater than the rated one to the stepper motor, it is possible to create an early detection system for stepper motor wear. For example, for a stepper motor that is used at a 1000 Hz start frequency; a frequency of 1200 Hz is applied. The next step is to apply a start frequency down in 100 Hz increments until a frequency at which the stepper motor is able to start. This number will decrease as the stepper motor ages and/or the load changes. Correlation studies can then be used to determine the relationship of this response to the actual remaining life. It might be determined, for example, that once the stepper motor fails to start at 1100 Hz, it will not be long before failures at the actual application frequency will begin to occur. This could be used as a predictive diagnostic signal. A customer service engineer (CSE) that is already at the site might decide to go ahead and replace the stepper motor at that point rather than waiting for the actual failure which will result in more downtime. Or, more conservatively, the CSE might simply order the replacement part and have it shipped to that customer site, so that when it does fail, there will be no call for maintenance.

In the same way, the current could be reduced to created a predictable failure model. If the stepper motor is used nominally at 2 Amps, a reduced current (either through a variable supply or using a PWM controlled supply) can be applied. The stepper motor, when new, could start at 1.0 Amps. As it ages, it might take 1.3 or 1.4 Amps to get it to start. A "replace" or "reorder" signal can be generated when the required current comes within/falls outside a predetermined tolerance of the nominal current.

A block diagram example of the heretofore-mentioned method of detecting degradation of a stepper motor using frequency is shown in FIG. 3, where a stepper motor is identified by a computer, (such as from control stage 16), at 70 and at 71 initiates the application of a predetermined frequency to the stepper motor that is greater than its rated frequency. If the stepper motor starts at 72, the frequency is recorded as the start frequency at 74 and a diagnostic signal is generated as appropriate. If the motor does not start, the predetermined frequency is decreased at 73 in levels, for example, of 100 Hz and an observation and/or record is made at 74 at each level as to whether the motor starts or not. This data at is then correlated to the aging life of the stepper motor and/or a signal is generated as appropriate.

Figure 4:
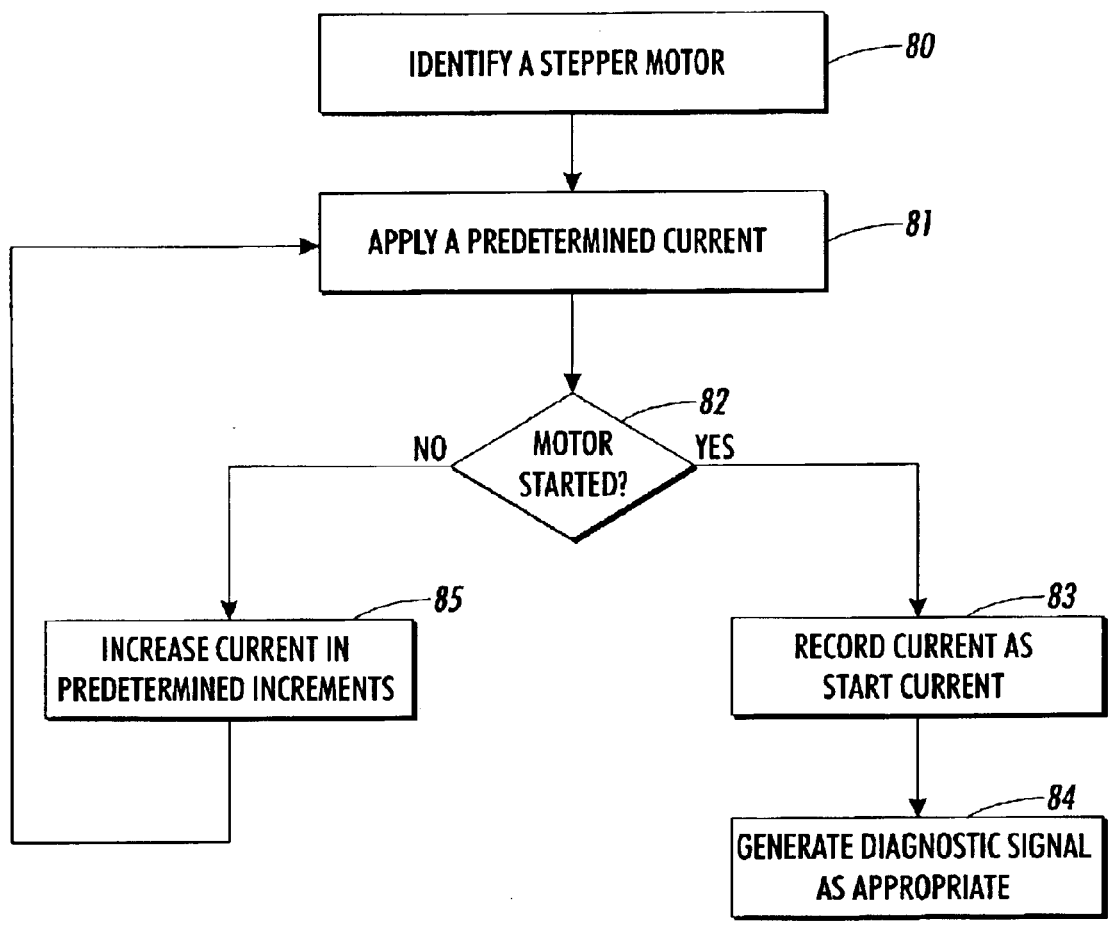
FIG. 4 is a schematic flow chart diagram illustrating the steps performed to determine whether a stepper motor is degrading using current to the stepper motor as a component.

In FIG. 4, a schematic flow chart is shown that includes the steps to determine if a stepper motor is degrading using current to the stepper motor. A stepper motor to be tested is identified in block 80 and a predetermined current that is less than the rated current for the stepper motor is applied to the stepper motor at 81. An observation is made at 82 to determine if the stepper motor started. If the stepper motor did start, a record is made of the starting current at 83 and a diagnostic signal is generated as appropriate at 84. When the starting current is within or outside a predetermined tolerance, a signal is generated that prompts the CSE to replace the stepper motor or place an order for a replacement stepper motor for subsequent replacement. If the stepper motor did not start at 82, the current is increased in predetermined increments at block 85 until the stepper motor does start. Once the stepper motor starts, the actions in blocks 83 and 84 are performed as mentioned heretofore.

Because a stepper motor is a constant current device, it is difficult to detect the occurrence of a successful start by simple current monitoring techniques. This diagnostic method depends on accurate detection of a successful start. With a technician at the machine, this can be done by direct observation. However, for remote diagnostics, other methods must be employed. Some stepper motors or their driven loads are connected to an encoder. In these cases, motion can be detected by simply reading the encoder output. Many other stepper motors have home sensors. In these cases, the diagnostic can be implemented by driving the motor away from the home position using normal current and frequency input. The motor is then driven back to the home position, under the applied stress input. Once the home sensor is tripped, the diagnostic application knows that the motor has started.

Figure 5:
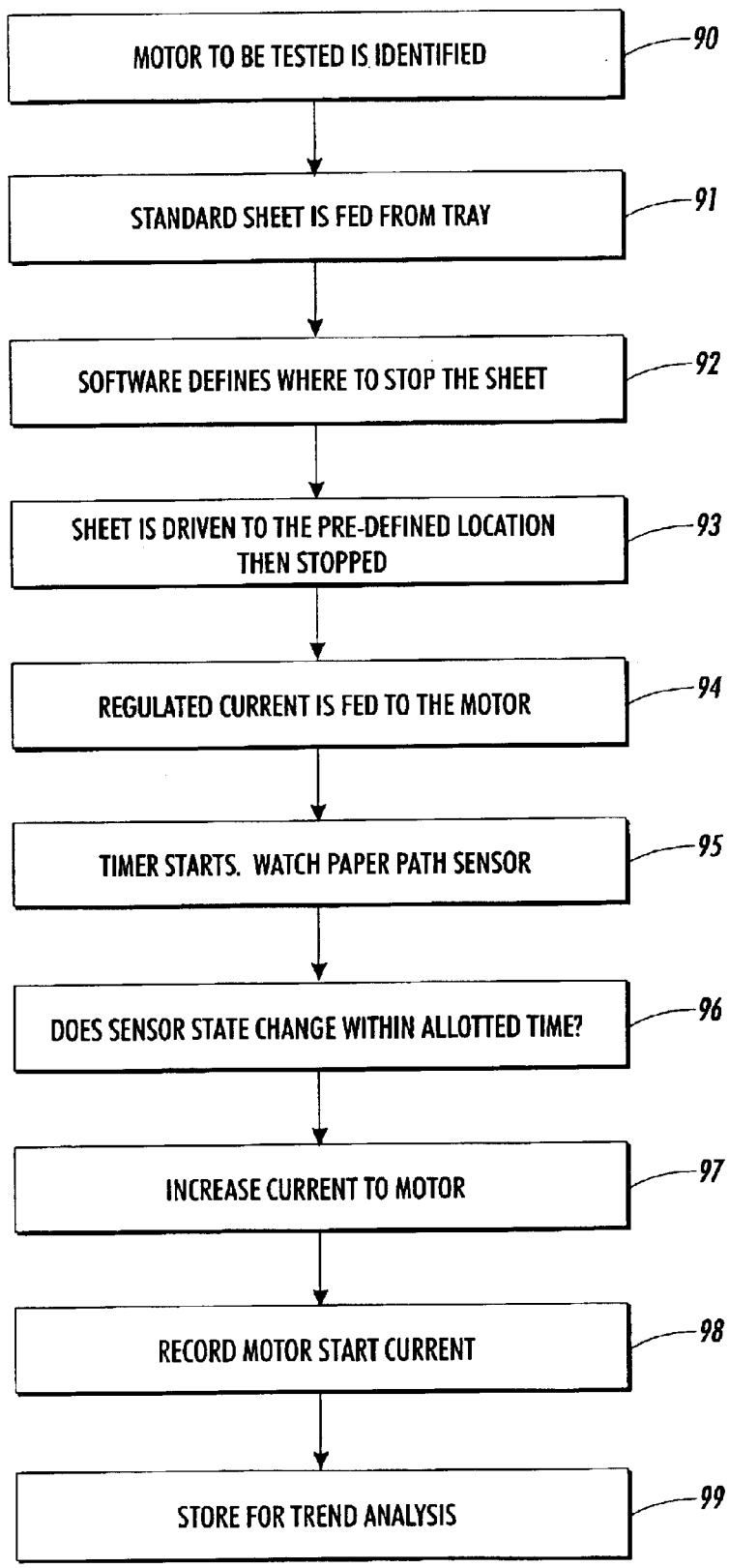
FIG. 5 is a schematic flow chart diagram illustrating the steps performed to determine paper path stepper motor motion.

Alternatively, a method is depicted in block diagram form in FIG. 5 for automatically detecting paper path stepper motor motion to thereby enable a diagnostic strategy for determining degraded stepper motors with the use of existing paper path sensors in printer 22. A stepper motor to be tested is identified by the machine's computer at block 90 and a standard sheet is fed from paper supply section 27 at 91. Software defines where to stop the sheet at 92 and the sheet is driven to the predetermined location and stopped at 93. It is important to define a location at which the sheet should be stopped. The point should be just upstream from a paper path sensor with the sheet being under the control of a nip that is driven by the selected stepper motor. Once the sheet is stopped, a regulated current at 94 is fed to the stepper motor that is significantly In lower than the standard operating current, e.g. 50%. The intent is to access the latitude of the stepper motor with respect to its load. The latitude will tend to decrease over time as both the stepper motor and the load deteriorates. Once the motor has been energized, a timer starts at 95 and the downstream sensor is monitored at 96 to see if the sheet arrives. If the sheet does not arrive in the allotted time, the current to the stepper motor is incrementally increased at 97 until the sheet does arrive. Once the sheet does arrive, the required current is recorded at 98 and stored at 99 for trend analysis. This information can be used for predictive diagnostics. Stepper motor testing with this method can also be performed manually, if desired. In the manual mode, a machine operator or technician activates the diagnostic routine that instructs them to place a sheet of paper in the prescribed location. The machine's graphical display is then used to illustrate precisely where the sheet is to be placed. Extreme precision is not required a long as adequate time is allowed for the sheet to arrive.

It should now be understood that a simple, low cost, stepper motor automated self-test method has been disclosed. The method includes artificially increasing the starting frequency and/or reducing the operating current by a known and controllable amount and using software to exercise the stepper motor and track the level at which the stepper motor is just able to start operating. By examining the magnitude and/or change in these levels, the remaining life and reliability of the stepper motor can be predicted. A method of automated detection of paper path stepper motor motion is also disclosed that includes coordinated use of the stepper motor self-test mentioned-heretofore with existing paper path sensors to determine the start time for the stepper motors. A record of the start times and start current can be used to predict failure of the stepper motor.

While the invention has been described in conjunction with the specific embodiments outlined above, it is evident that many alternatives, modifications and variations will be apparent to those skilled in the art. Accordingly, the preferred embodiments of the invention as set forth above are intended to be illustrative and not limiting. Various changes may be made without departing from the spirit and scope of the invention as defined herein.

What is claimed is:

1. A method for diagnosing degradation of stepper motors due to wear, comprising the steps of:
   a) identifying a stepper motor to be tested;
   b) applying a predetermined frequency to the stepper motor that is greater than the nominal starting frequency for the stepper motor;
   c) observing if the stepper motor starts;
   d) recording the frequency if the motor starts as the start frequency;
   e) decreasing the frequency to the stepper motor in predetermined increments if the motor does not start in step c);
   f) observing if the stepper motor starts after each decreasing frequency; and
   g) correlating the responses to the aging life of the stepper motor.

2. The method of claim 1, including performing steps a)–g) in an image forming system.

3. The method of claim 1, including the step of decreasing said frequency in step e) in increments of 100 Hz.

4. A method for diagnosing whether a stepper motor is functioning properly, comprising the steps of:
   a) identifying a stepper motor to be tested;
   b) providing a paper sensor downstream of said stepper motor;
   c) feeding a sheet from a tray;
   d) stopping the sheet in a predetermined location upstream of said paper sensor within a nip that is driven by said stepper motor;
   e) applying a predetermined current to said stepper motor that is less than its standard operating current;
   f) starting a timer;
   g) monitoring said paper sensor to determine state change indicating arrival of the sheet at said sensor within a predetermined time;
   h) recording motor start time; and
   i) storing said motor start current for trend analysis.

5. The method of claim 4, including the step of increasing the current to said stepper motor by a predetermined amount when the sheet does not arrive at said sensor within said predetermined time.

6. The method of claim 4, including performing steps a)–i) in an image forming system.

* * * * *